(12) United States Patent
Allison et al.

(10) Patent No.: US 6,920,906 B2
(45) Date of Patent: Jul. 26, 2005

(54) PNEUMATIC TIRE WITH SIDEWALL PROJECTIONS

(75) Inventors: William B. Allison, Cuyahoga Falls, OH (US); James G. Guspodin, Akron, OH (US); David M. Reep, Copley, OH (US); John E. Young, Wadsworth, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 151 days.

(21) Appl. No.: 10/159,750

(22) Filed: May 29, 2002

(65) Prior Publication Data

US 2003/0041939 A1 Mar. 6, 2003

Related U.S. Application Data

(60) Provisional application No. 60/316,623, filed on Aug. 31, 2001.

(51) Int. Cl.[7] .......................... B60C 11/01; B60C 11/11; B60C 107/00; B60C 121/00
(52) U.S. Cl. .................... 152/209.16; 152/523; 152/902
(58) Field of Search ............................ 152/209.16, 523, 152/902; D12/605

(56) References Cited

U.S. PATENT DOCUMENTS

| | | | |
|---|---|---|---|
| 1,946,209 A | | 2/1934 | Hardeman et al. |
| D92,281 S | * | 5/1934 | Anderson ................ D12/577 |
| 3,247,880 A | | 4/1966 | Batori |
| 3,421,566 A | | 1/1969 | Sidles et al. |
| 3,482,616 A | | 12/1969 | French |
| 3,789,900 A | | 2/1974 | Verdier |
| 3,818,964 A | | 6/1974 | Maiocchi |
| 4,267,872 A | | 5/1981 | Kamiya |
| 4,723,585 A | | 2/1988 | Mechtel |
| 4,915,150 A | | 4/1990 | Takusagawa et al. |
| 4,982,773 A | | 1/1991 | Bonko |
| 5,188,683 A | | 2/1993 | Bonko |
| 5,259,429 A | | 11/1993 | Harms |
| 5,361,814 A | | 11/1994 | Covert et al. |
| 5,456,301 A | * | 10/1995 | Wise ..................... 152/209.15 |
| 5,849,118 A | | 12/1998 | Matsumoto |
| 6,058,995 A | | 5/2000 | Matsumoto |
| 6,102,094 A | | 8/2000 | Matsumoto |
| 6,189,586 B1 | | 2/2001 | Guidry |
| D441,697 S | * | 5/2001 | Allison ..................... D12/536 |
| 6,250,353 B1 | * | 6/2001 | Maxwell ................ 152/209.15 |
| D454,815 S | * | 3/2002 | Guspodin et al. .......... D12/605 |
| 6,533,007 B1 | * | 3/2003 | McMannis ............. 152/209.16 |

FOREIGN PATENT DOCUMENTS

| | | | |
|---|---|---|---|
| JP | 55-91408 | * | 7/1980 |
| SU | 180099 | * | 2/1966 |
| WO | WO 99/52720 | | 10/1999 |

* cited by examiner

*Primary Examiner*—Steven D. Maki
(74) *Attorney, Agent, or Firm*—Michael Sand

(57) ABSTRACT

A pneumatic tire has an aggressive tread pattern for use on both on-road and off-road vehicles having at least a pair of intermediate ribs and a pair of shoulder ribs providing the ground engaging tread lugs. A plurality of circumferentially extending lug groups are formed on and extend outwardly from and along the sidewalls of the tire. Each lug group preferably includes three separate lugs, each lug having a substantially flat outer surface lying in a different plane than the outer surfaces of the other two lugs. Two of the lugs are radially aligned with each other along the sidewall of the tire with the third lug lying intermediate spaced pairs of these aligned lugs. The lugs are formed with sharp corners offset from each other which extend outwardly from the sidewall to different levels. A top surface of one of the lugs aligns with the ground engaging surface of an adjacent shoulder rib tread lug and the top surface of the intermediate lug aligns with the inner tread surface of the road engaging tread pattern.

12 Claims, 12 Drawing Sheets

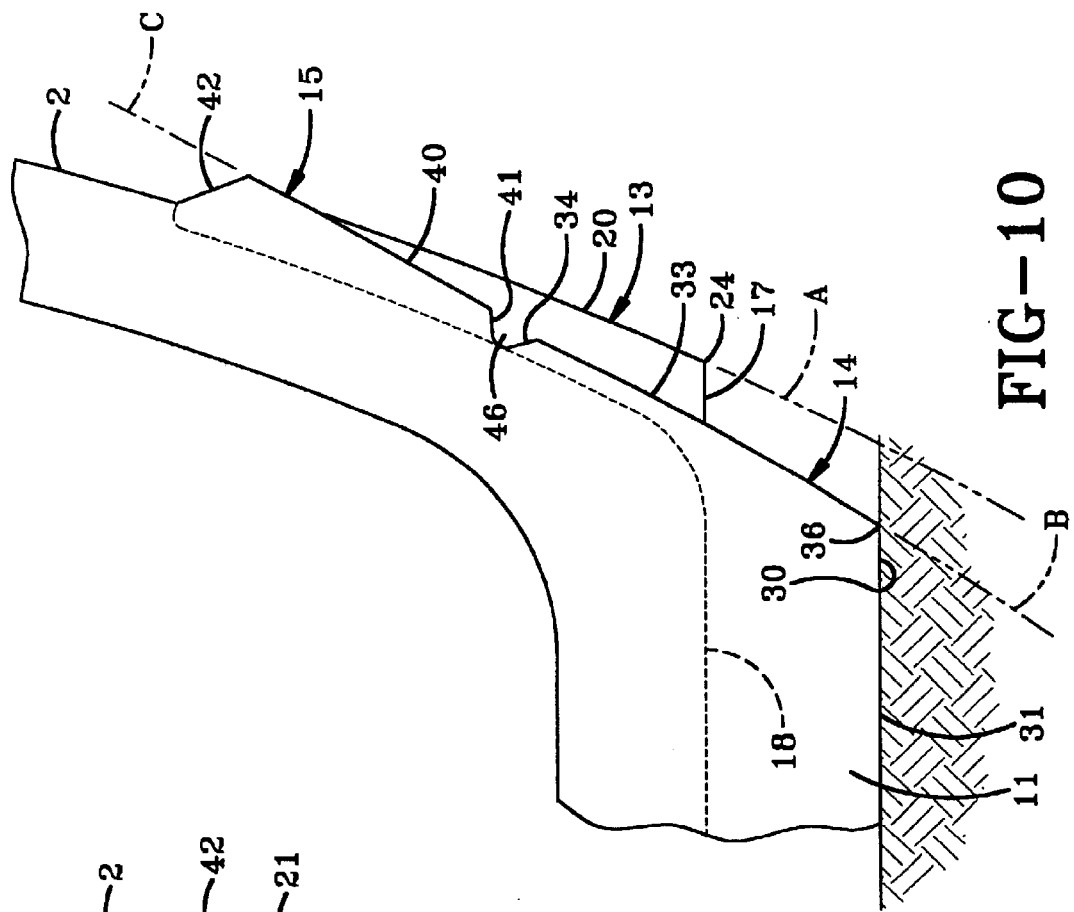
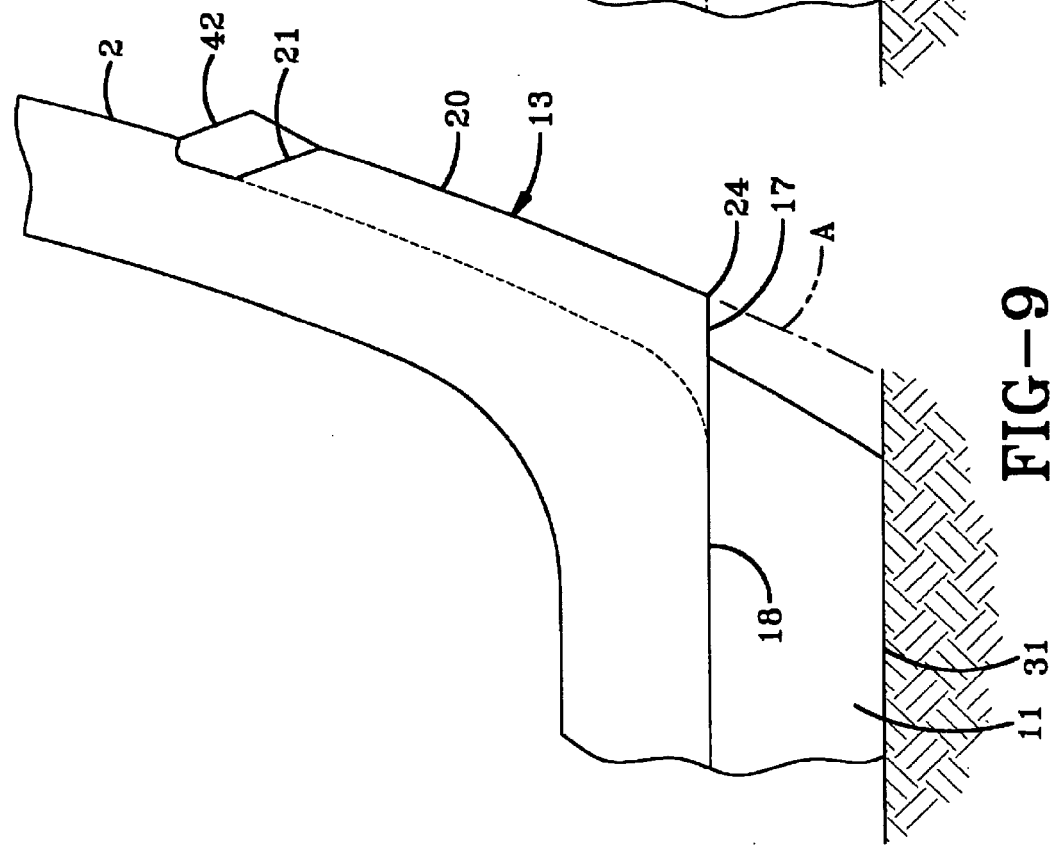

PNEUMATIC TIRE WITH SIDEWALL PROJECTIONS

CROSS REFERENCE TO RELATED APPLICATION

This application claims the benefit of provisional application Ser. No. 60/316,623, filed Aug. 31, 2001.

BACKGROUND OF THE INVENTION

1. Technical Field

The invention relates to pneumatic tires and more particularly to a pneumatic tire for both off-road and on-road usage having sidewall projections which deflect debris away from the sidewalls to prevent sidewall penetration and which provides increased traction for soft or compact soil conditions when used off-road.

2. Background Information

Numerous pneumatic tires have been designed with aggressive tread patterns for use both on-road and off-road which have various sidewall projections to prevent the accumulation of dirt and debris in the sidewalls when used off-road. These projections also reduce sidewall penetration and provide increased traction in various soil conditions such as mud, sand, gravel, etc. and in extremely rocky conditions.

Many of these prior tread patterns such as shown in FIG. 15, are provided with various sidewall projections to reduce sidewall penetration by foreign objects and to increase traction for the various soil conditions in which the tire can encounter. Some examples of such tires are shown in U.S. Pat. Nos. 1,946,209, 3,247,880, 3,421,566, 3,482,616, 3,789,900, 3,818,964, 4,267,872, 4,723,585, 4,915,150, 4,982,773, 5,188,683, 5,361,814, and 6,102,094.

Although these tires and their tread patterns may provide increased traction in soft sand and similar soil, some of them are limited almost entirely to off-road use and would not perform satisfactorily on a paved road. Likewise, some of these tires do not provide the desired traction, especially in extremely deep ruts, to enable the tire to dig itself out from extremely soft and muddy conditions while providing the desired amount of debris deflection and reduced accumulation of mud and rocks in the sidewall area, which area is more susceptible to puncture than the ground engaging tread area of the tire.

Thus, the need exists for a pneumatic tire having an aggressive tread pattern including sidewall projections for use both on-road and off-road, and which provides increased traction in soft or compacted soil conditions.

BRIEF SUMMARY OF THE INVENTION

The present invention provides a pneumatic tire having an aggressive tread pattern wherein the usual ground engaging circumferentially extending ribs and tread lugs can have various patterns to provide desired on-road ride and wear characteristics.

The pneumatic tire of the invention has a sidewall lug pattern of repeating lug groups wherein each group consists of two or three lugs, two of which are in alignment with each other radially along the sidewall and a third being intermediate adjacent pairs of said radially aligned lugs.

Another aspect of the invention provides for each of the lugs of the repeating lug groups to have generally flat outer surfaces which lie in different planes with respect to each other and which provide a plurality of sharp corners and edges for biting into the soil at various levels to increase traction, to prevent the accumulation of debris between the lugs, and to deflect debris away from the buttress shoulders of the tire which area is the most vulnerable when used off road.

A further aspect of the invention preferably has the intermediate lug with a top surface that aligns with the inner tread surface of the road engaging portion of the tire, and with one of the radially aligned lug pairs having a top surface which aligns with the top ground engaging surface of an adjacent lug, both of which have sharp corners for digging into the surrounding soil.

Another feature of the invention is providing each lug group with three individual lugs each having outwardly tapered side and bottom surfaces which reduce the accumulation of debris therebetween and which provide a plurality of spaced edges at various distances from the sidewall for increased traction in dry ruts as well as in soft soil conditions.

Another aspect of the invention is that the three lugs of the repeating lug groups provides three different levels along the sidewall which reduces the collection of materials by providing discontinuous surfaces along the sidewall and which provide the tire with the ability to gain forward traction in deep ruts to pull the vehicle forward.

These advantages, construction, and operation of the present invention will become more readily apparent from the following description of the accompanying drawings.

BRIEF DESCRIPTION OF THE DRAWINGS

FIG. 9 is an enlarged fragmentary view similar to FIG. 5 showing the sidewall area of the tire when engaged with a relatively flat surface;

FIG. 10 is an enlarged fragmentary view similar to FIG. 6 showing the tire on a relatively flat surface;

Similar numerals refer to similar parts throughout the drawings.

DETAILED DESCRIPTION OF THE INVENTION

Figure 1:
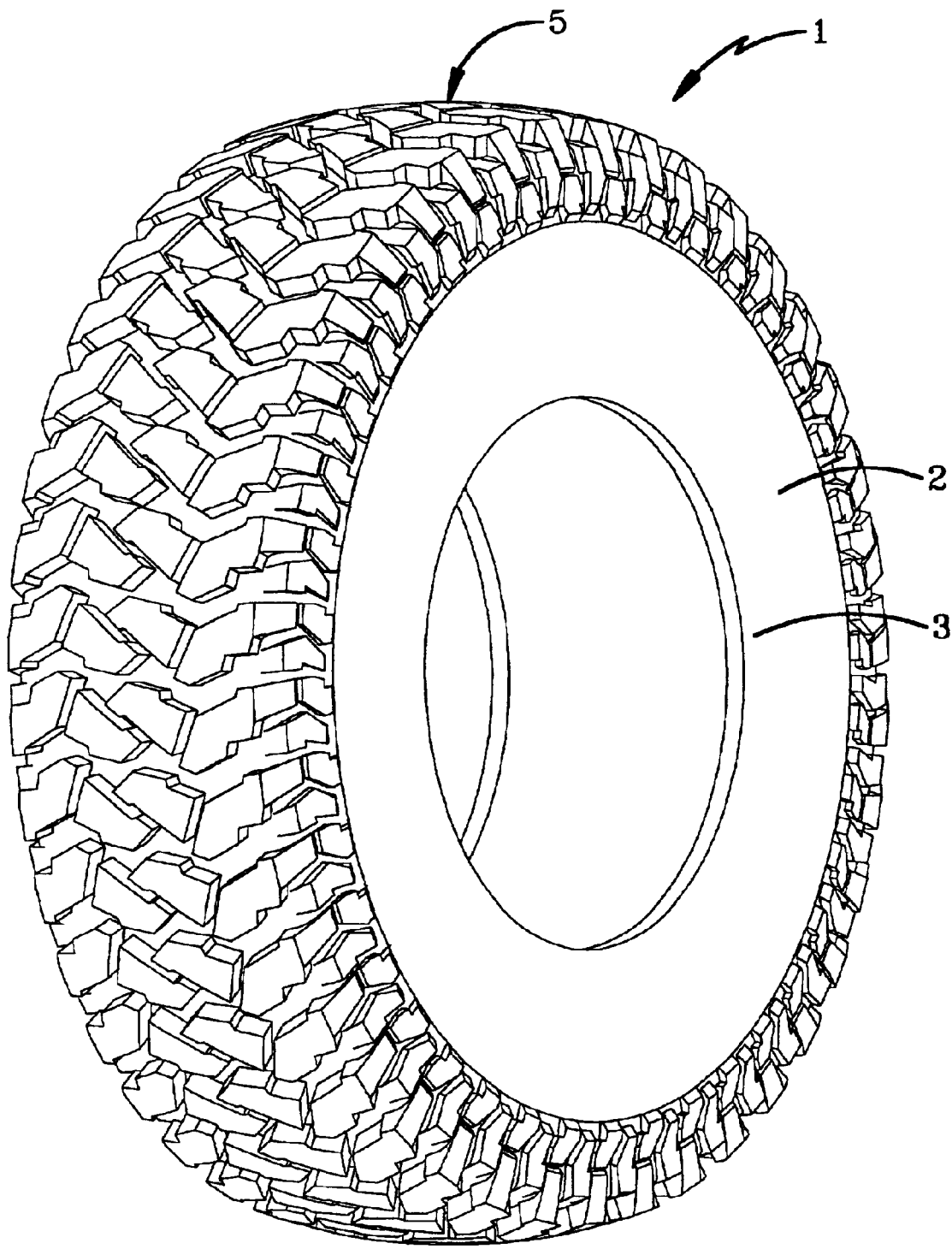
FIG. 1 is a side perspective view of a pneumatic tire having an aggressive tread pattern and the sidewall projections of the present invention.
Figure 2:
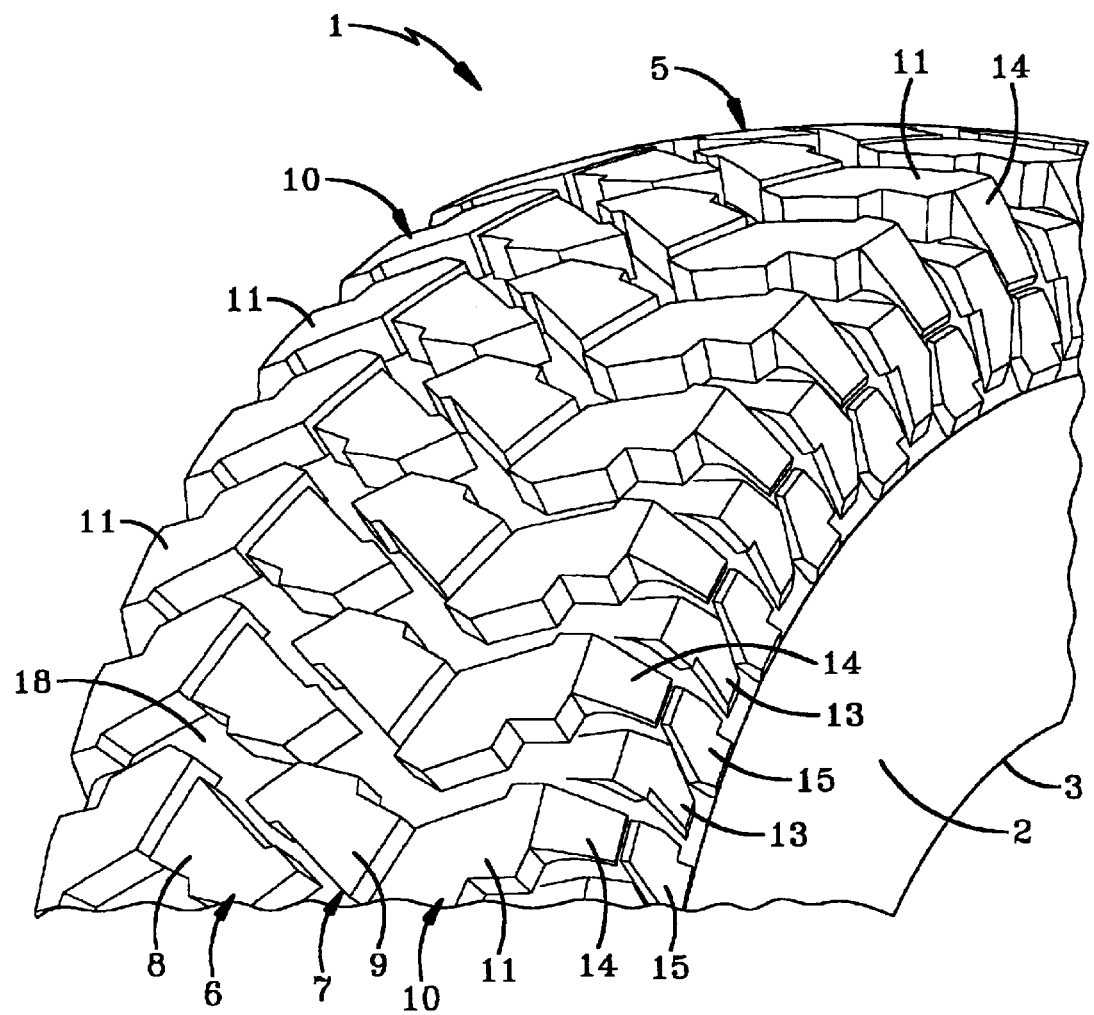
FIG. 2 is an enlarged fragmentary perspective view of a portion of the tire tread shown in FIG. 1.
Figure 3:
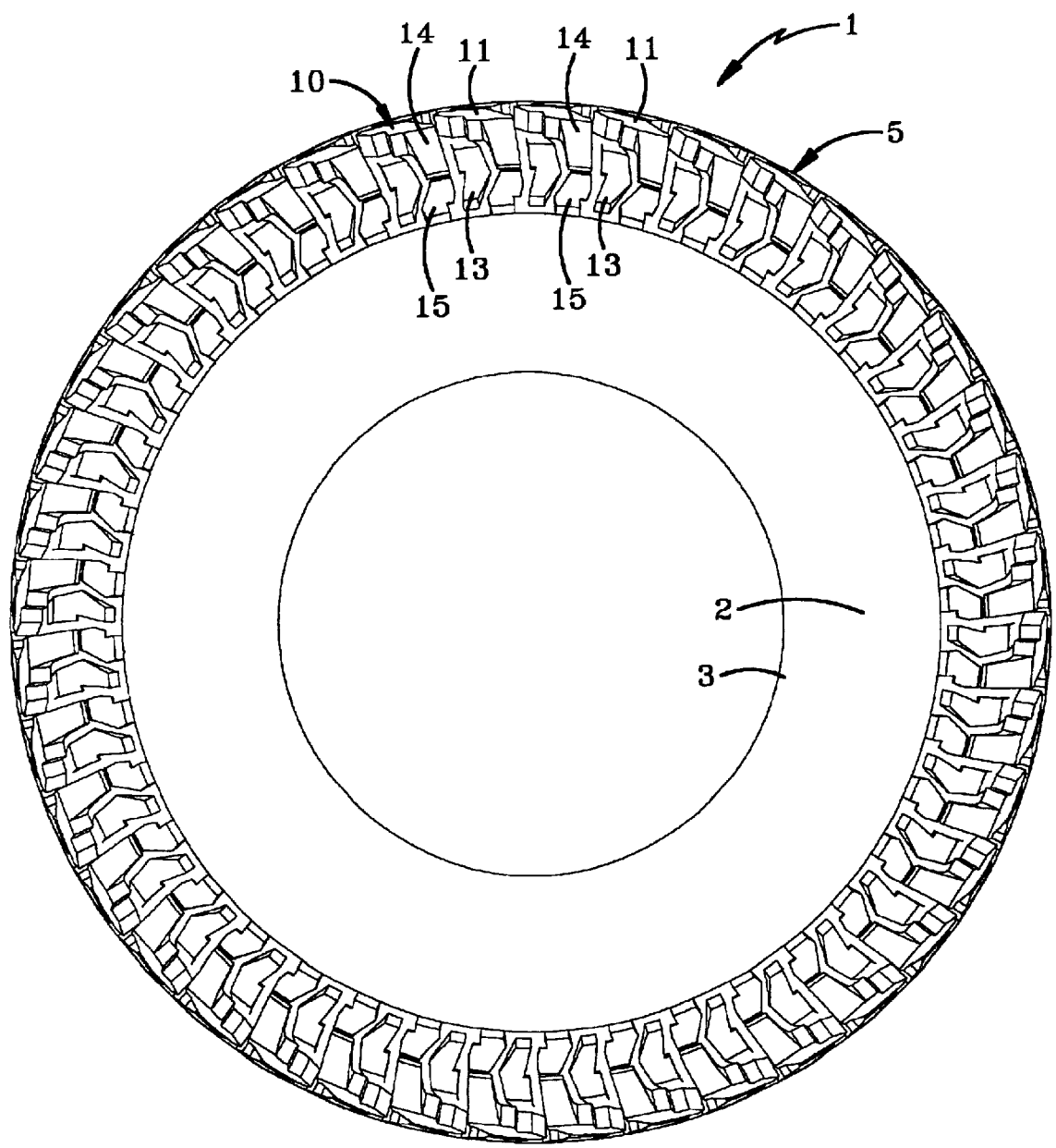
FIG. 3 is a side elevational view of the tire shown in FIG. 1.

FIG. 1 shows a first embodiment of the improved pneumatic tire having the unique arrangement of sidewall projections formed thereon indicated generally at 1, and shown in further detail in FIGS. 2–6. Tire 1 includes a pair of sidewalls 2 terminating in a pair of bead areas 3 for securing the tire on a vehicle rim 4 and terminating in a circumferentially extending road engaging tread pattern indicated generally at 5. Referring to FIG. 2, the particular tread pattern 5 shown therein, includes a pair of intermediate ribs 6 and 7 which extend circumferentially about the tire and formed by a plurality of irregularly spaced tread lugs 8 and 9 respectively. Tread pattern 5 further includes a pair of similar shoulder ribs 10 which extend circumferentially about the tire and formed by a plurality of spaced tread lugs 11. This road engaging tread pattern can vary from that shown in embodiment 1 without effecting the concept and principle features of the invention and can be designed to provide various on-road riding conditions.

In accordance with the invention, a plurality of lugs or projections are formed on the axial outermost surface of the sidewalls and extend outwardly therefrom, as shown particularly in FIGS. 4–10. These sidewall lugs include repeating groups of individual lugs spaced circumferentially along the sidewalls. Each group preferably consists of at least three lugs indicated at 13, 14, and 15, designated hereinafter as first, second, and third lugs respectively. However, two lugs per group could be utilized for certain applications.

Each first lug 13 includes a top surface 17 which is radially aligned and lies generally at the same level with inner tread surface 18 of tread pattern 5, from which the various road engaging tread lugs 8, 9, and 11 extend outwardly therefrom. Top surface 17 extends radially outwardly and terminates in a generally flat outer surface 20 which extends radially along the sidewall of the tire terminating in a downwardly tapered lower end surface 21. First lug 13 also includes a generally Z-shaped side surface 22 and angled side surface 23 which form a plurality of relatively sharp corners with outer surface 20. Top surface 17 also forms a sharp corner 24 with outer surface 20.

Each second lug 14 has a generally flat top surface 30 which is radially aligned with and extends outwardly from a generally flat ground engaging top surface 31 of an adjacent shoulder lug 11. Lug 14 further includes a generally flat outer surface 33 which extends downwardly along sidewall 2 terminating in a lower end surface 34. Lug 14 has a pair of relatively straight side surfaces 35 which extend from outer surface 33 to sidewall 2. Top surface 30 and outer surface 33 form a sharp corner 36 as does surface 33 with side surfaces 35.

Figure 4:
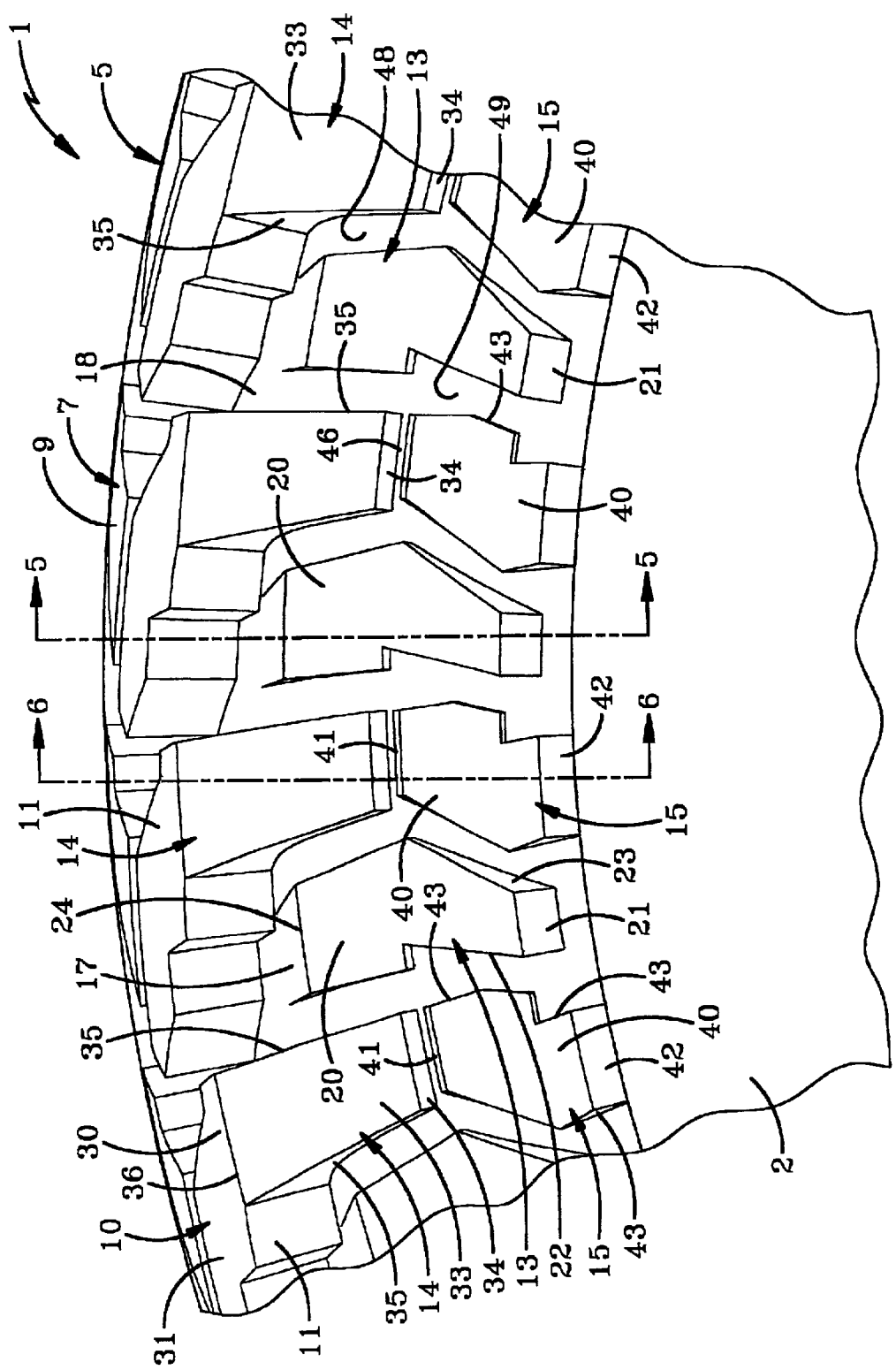
FIG. 4 is a further enlarged fragmentary side perspective view of the sidewall region of the tire of FIGS. 1–3.
Figure 8:
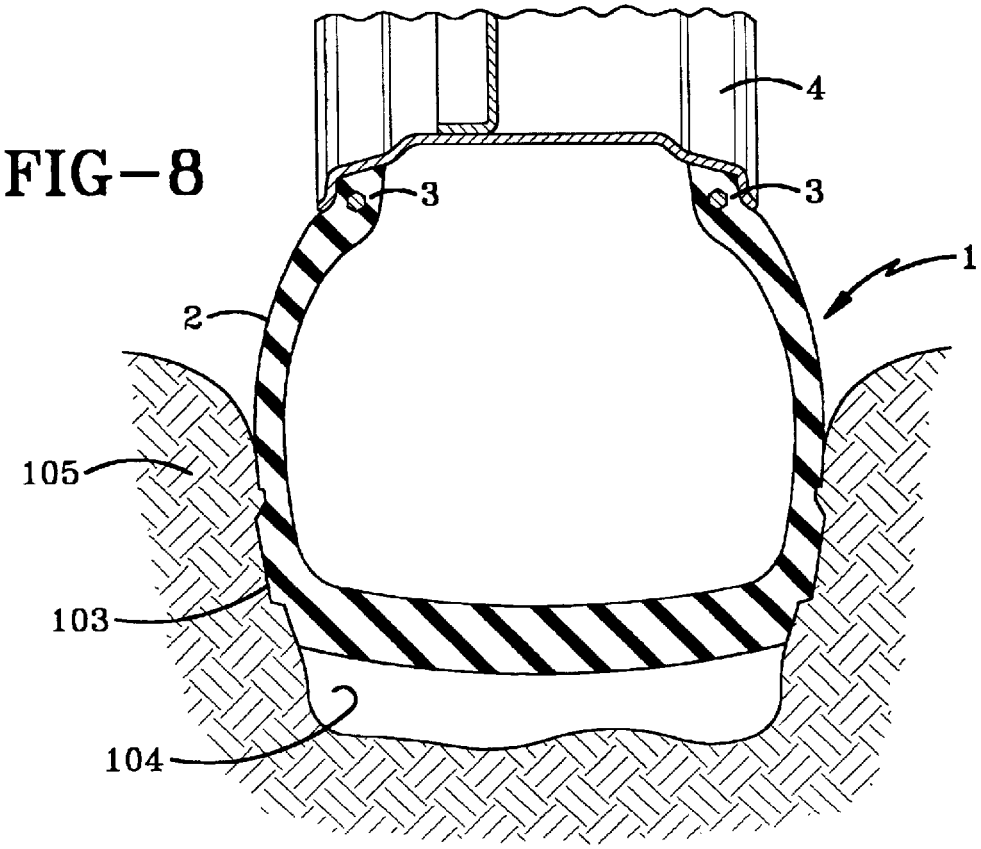
FIG. 8 is a diagrammatic view of the pneumatic tire of FIG. 7 extracting itself from a ground rut.

Third lugs 15 are radially aligned with second lugs 14 and are located between lugs 13 and bead areas 3. Each lug 15 has a flat outer surface 40 which terminates in a top end surface 41, a bottom end surface 42, and a pair of irregularly shaped side surfaces 43, all of which extend from top end surface 41 toward sidewall 2. Top end surface 41 of lug 15 is spaced a short distance below bottom surface 34 of lug 14 and forms a groove or gap 46 therebetween. Again, the junction of the outer surface 40 with the top, bottom, and side surfaces form a plurality of sharp corners for digging into the compacted surface as shown in FIG. 8. As shown in FIG. 4, each first lug 13 is located intermediate adjacent pairs of radially aligned lugs 14 and 15 and form generally irregular shaped grooves 48 and 49 therebetween. These irregularly shaped grooves and different levels of outer surfaces 20, 33, and 40 with respect to sidewalls 2, provide the desired debris deflection and soil traction of the present invention.

Figure 11:
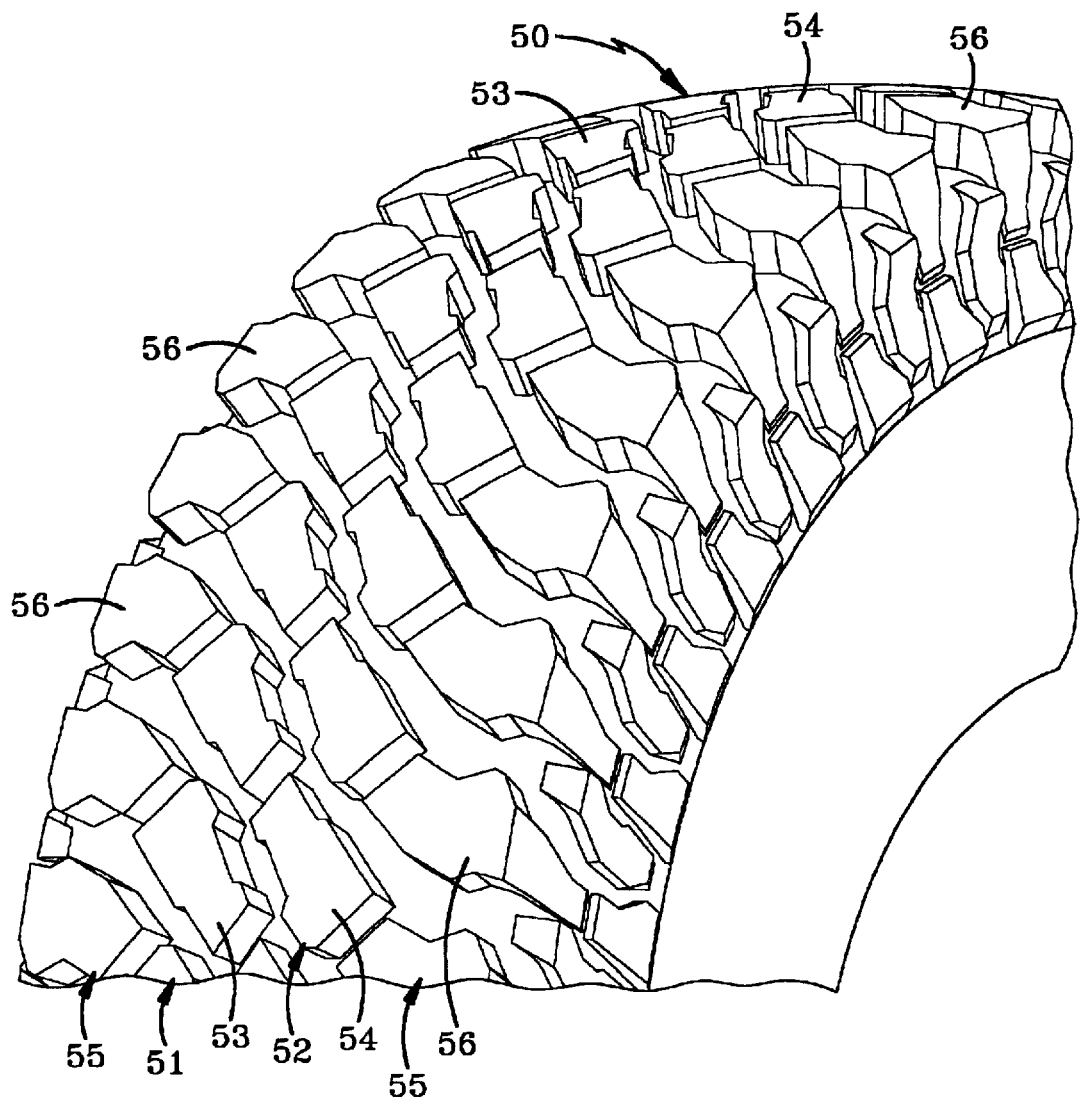
FIG. 11 is a fragmentary side perspective view similar to FIG. 2 of a second embodiment of the improved pneumatic tire.
Figure 12:
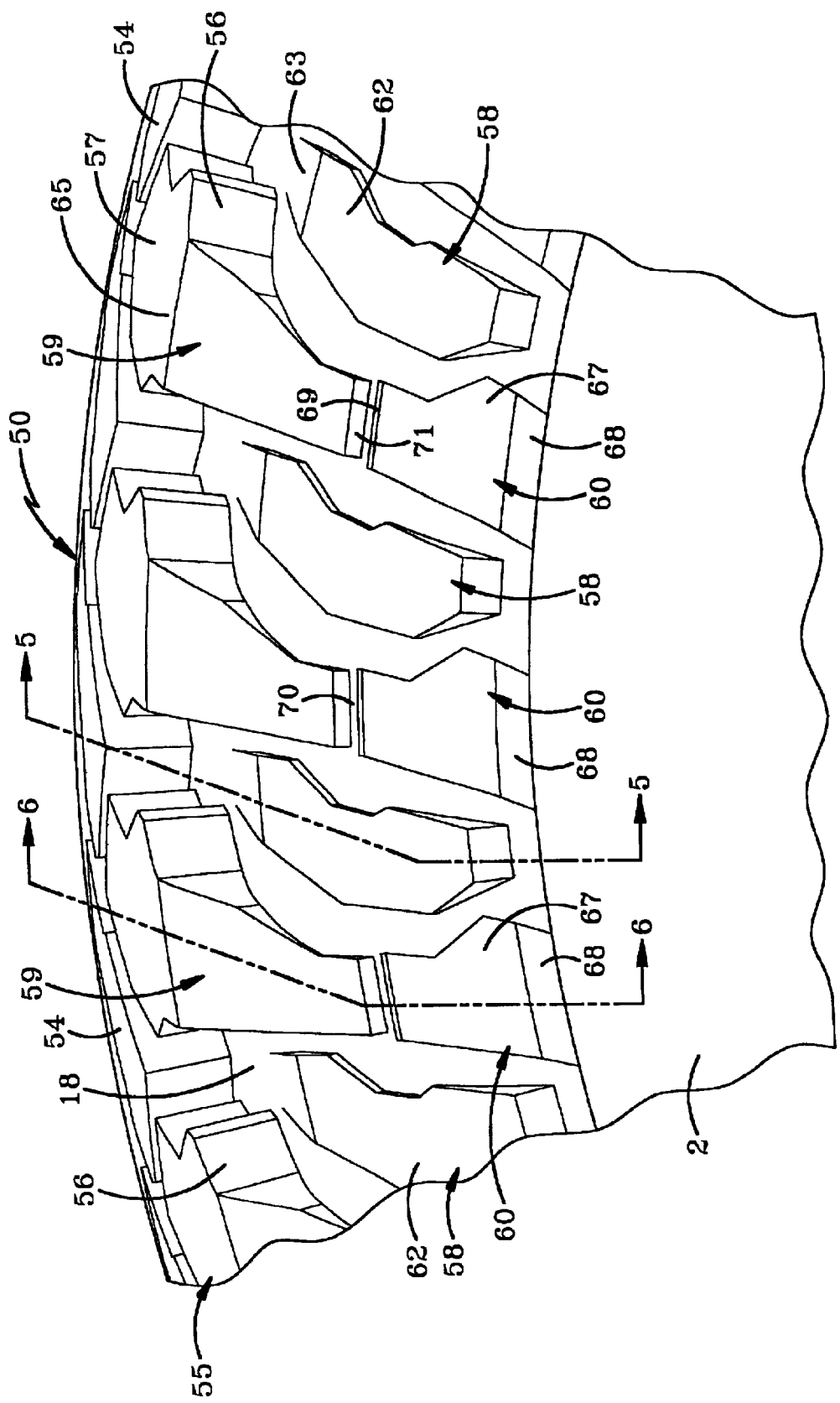
FIG. 12 is a fragmentary side perspective view similar to FIG. 4 of the embodiment shown in FIG. 11.

FIGS. 11 and 12 show a second pneumatic tire embodiment indicated generally at 50. The tread pattern of embodiment 50 includes intermediate ribs 51 and 52 formed by individual circumferentially spaced lugs 53 and 54 respectively, which have a different geometrical configuration than lugs 8 and 9 of ribs 6 and 7 of tire 1. Likewise, shoulder ribs 55 which are formed by individually circumferentially spaced lugs 56, also have different geometrical configurations than that of shoulder lugs 11 of ribs 10 in embodiment 1.

Figure 6:
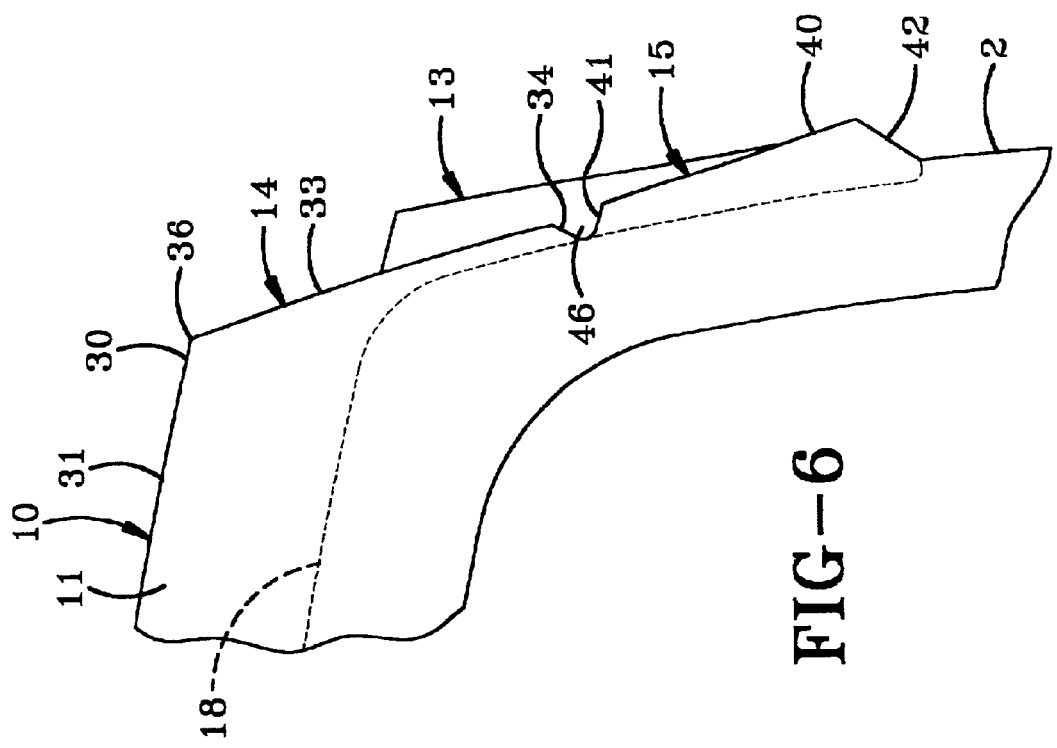
FIG. 6 is an enlarged fragmentary view taken on line 6—6, FIG. 4.
Figure 5:
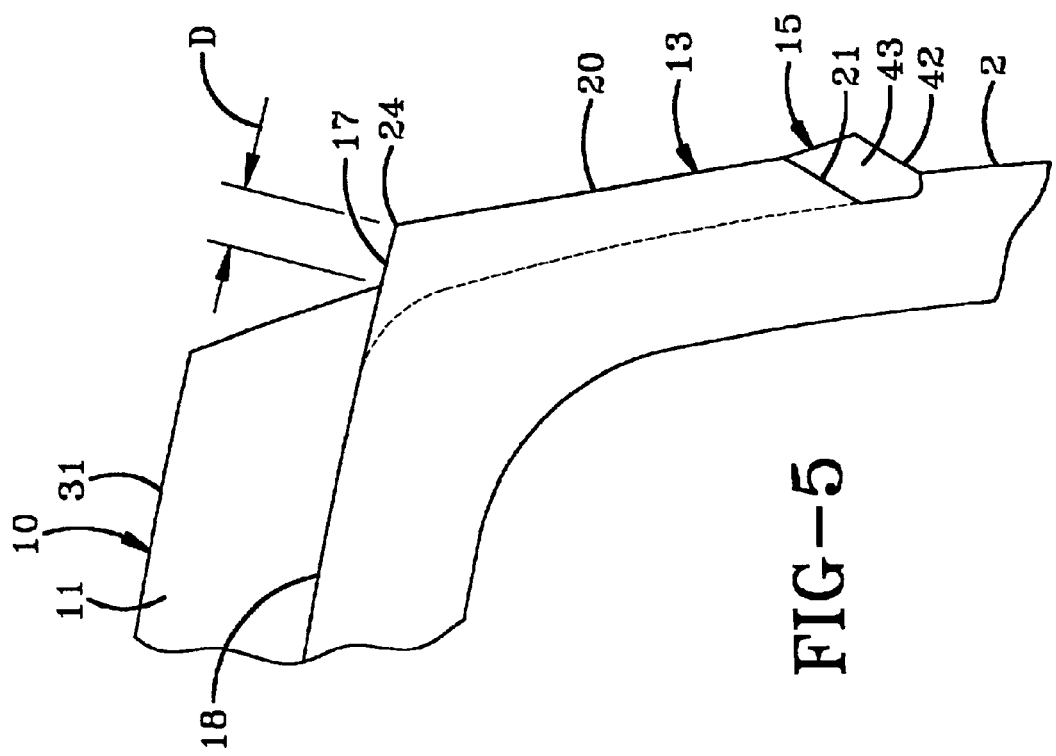
FIG. 5 is an enlarged fragmentary view taken on line 5—5, FIG. 4.

As shown in FIG. 12, sidewall projections are formed by repeating lug groups, each preferably including three individual lugs indicated at 58, 59, and 60 which correspond to lugs 13, 14, and 15 respectively, of embodiment 1. As shown by comparison of FIGS. 4 and 12, lugs 58–60 have different geometric configurations than lugs 13–15. However, in accordance with the invention, the cross sectional configurations thereof as shown in FIGS. 5 and 6, are the same for the lugs of embodiments 1 and 50 even though the geometrical configurations or shape thereof are different. Again, the important features are that generally flat outer surface 62 of first lug 58 has a top surface 63 which aligns with and lies generally in the same plane as inner tread surface 18. Likewise, top surface 65 of second lug 59 merges into and lies in the same general plane as ground engaging surface 65 of adjacent shoulder rib lug 56. Also, third lug 60 is radially aligned with second lug 59 and has a generally flat outer surface 67 and a tapered lower end surface 68 and a tapered upper surface 69 which forms a small groove or gap 70 with the tapered bottom surface 71 of second lug 59.

Figure 13:
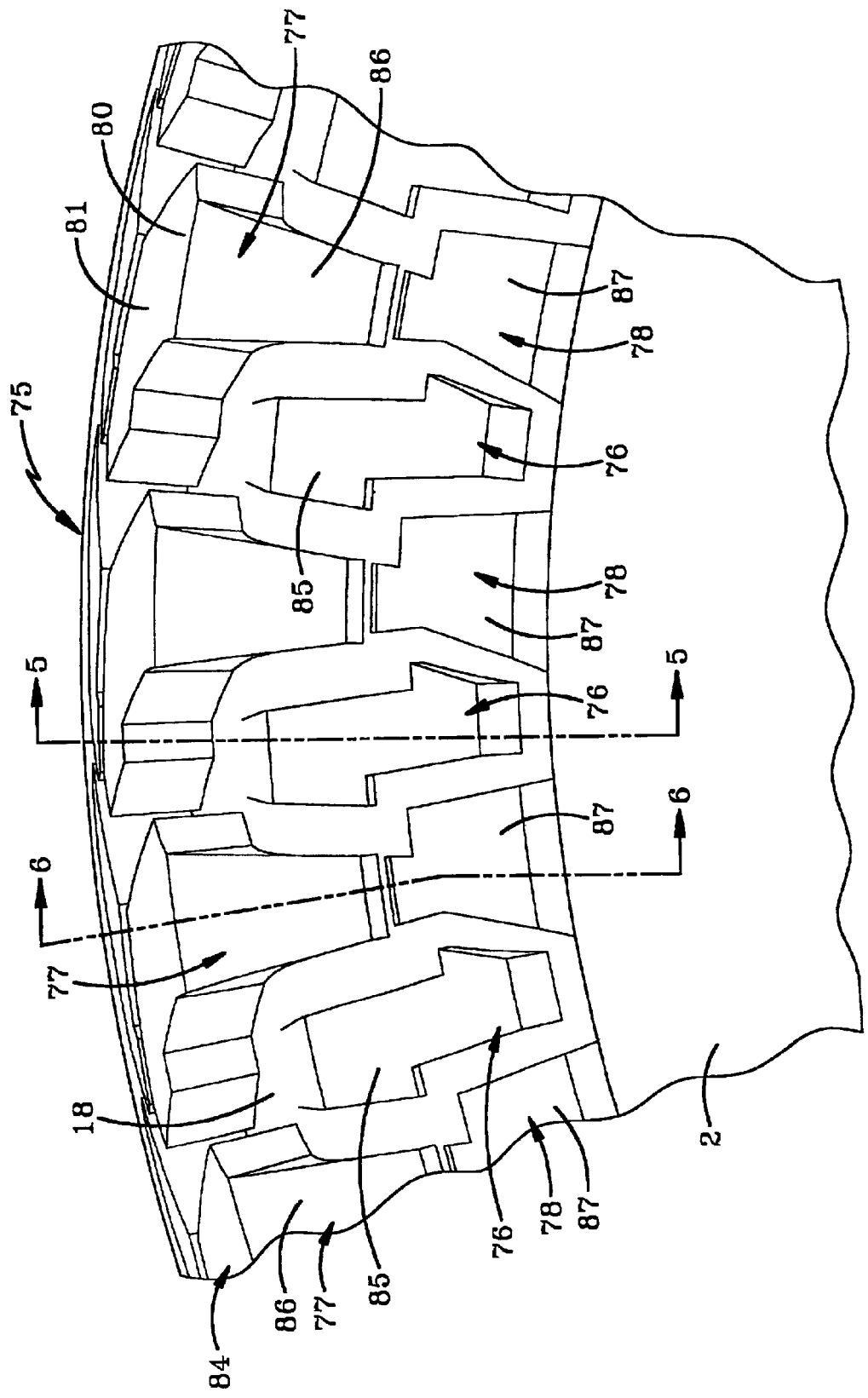
FIG. 13 is a fragmentary side perspective view similar to FIGS. 4 and 12 of a third embodiment of the improved pneumatic tire.

A third pneumatic tire embodiment is indicated generally at 75, and is shown in FIG. 13. Embodiment 75 includes the three lugs per lug group, designated as lugs 76, 77, and 78, which again have a different geometrical configuration or shape than that of lugs 13, 14, 15, 58, 59, and 60 of embodiments 1 and 50 respectively. However, as shown in FIGS. 5 and 6, lugs 76–78 have the same cross sectional configuration and relationship with each other, as well as their relationship with the top surface of the adjacent ground engaging shoulder rib lug and inner tread surface 18 as discussed previously. As shown in FIG. 13, top surface 80 of lug element 77 aligns with ground engaging surface 81 of shoulder rib 84. Likewise, flat outer surfaces 85, 86 and 87 of lugs 76, 77 and 78, respectively, will lie in the same general planes as do the flat outer surfaces of lugs 13–15 and 76–78 as shown in FIGS. 5 and 6.

Figure 14:
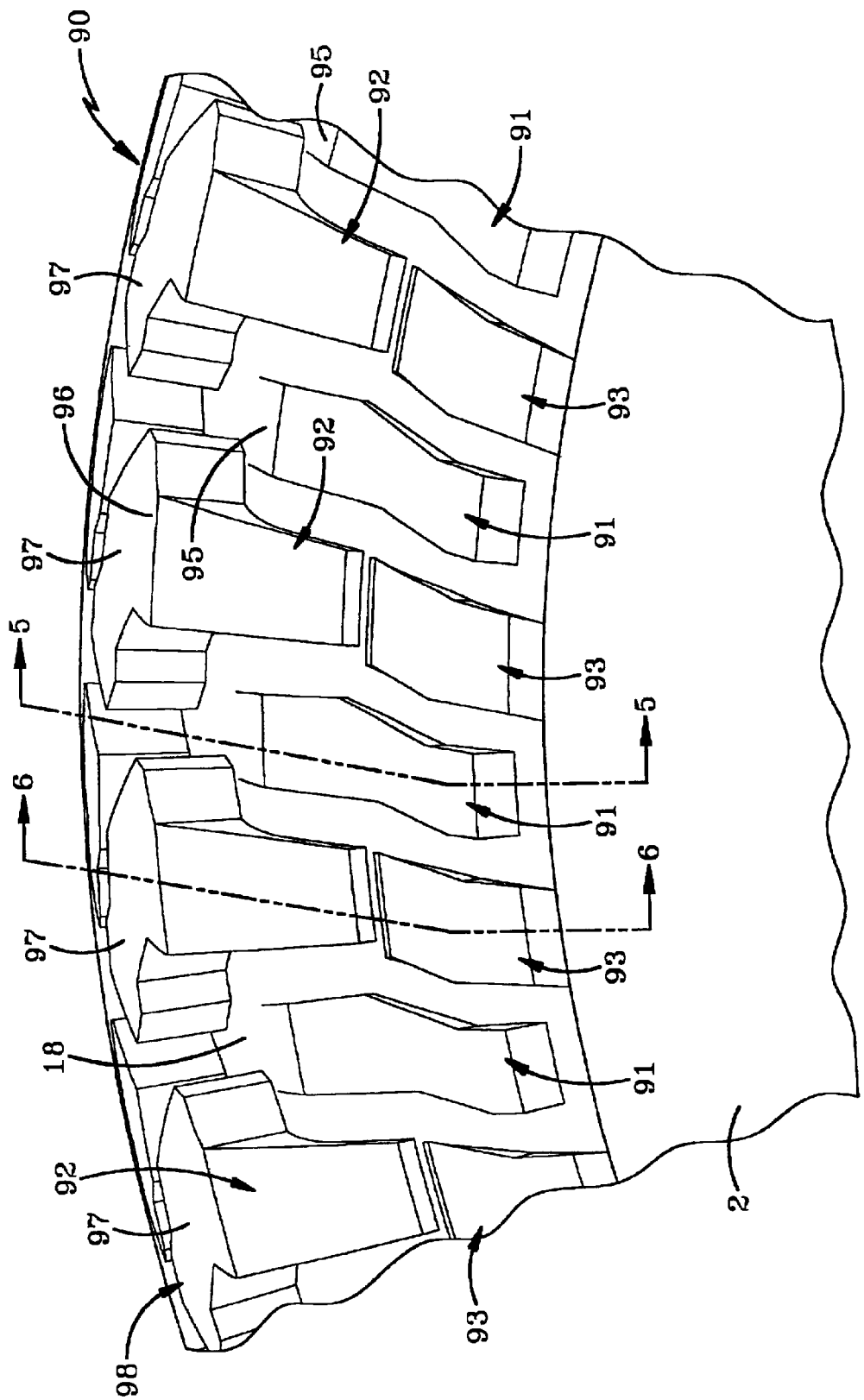
FIG. 14 is an enlarged fragmentary view similar to FIGS. 4, 12 and 13 of a fourth embodiment of the improved pneumatic tire.
Figure 15:
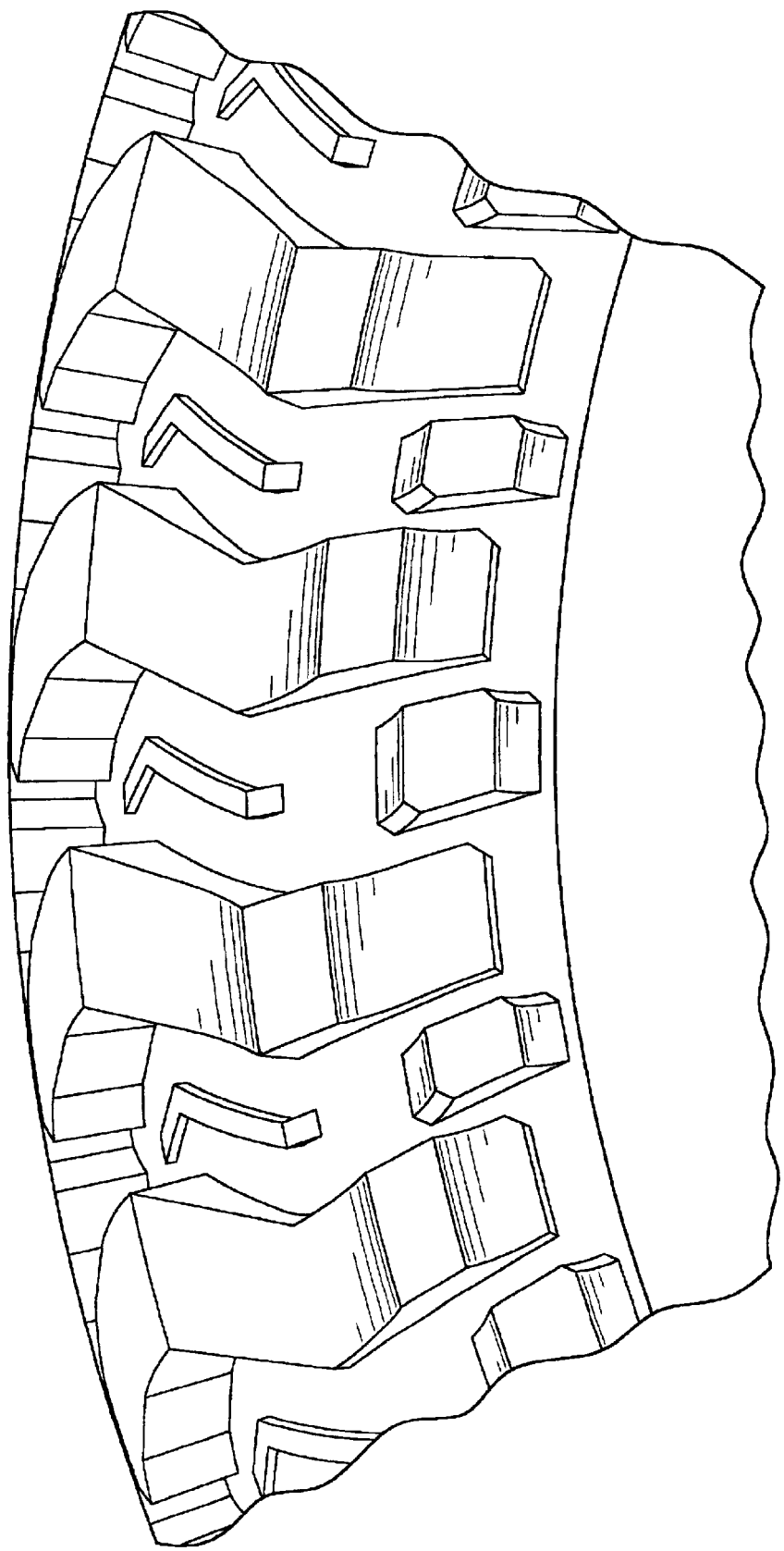
FIG. 15 is a fragmentary perspective view of a prior art tire with sidewall projections.

A fourth pneumatic tire embodiment is shown in FIG. 14 and is indicated generally at 90. Embodiment 90 again has the circumferentially spaced lug groupings with the three individual lug elements being indicated at 91, 92, and 93, which correspond to lug elements 13–15, 58–60, and 76–78. Top surface 95 of first lug 91 aligns with inner tread surface 18 and top surface 96 of second lug 92 merges into and aligns with top road engaging surface 97 of shoulder rib 98.

Figure 7:
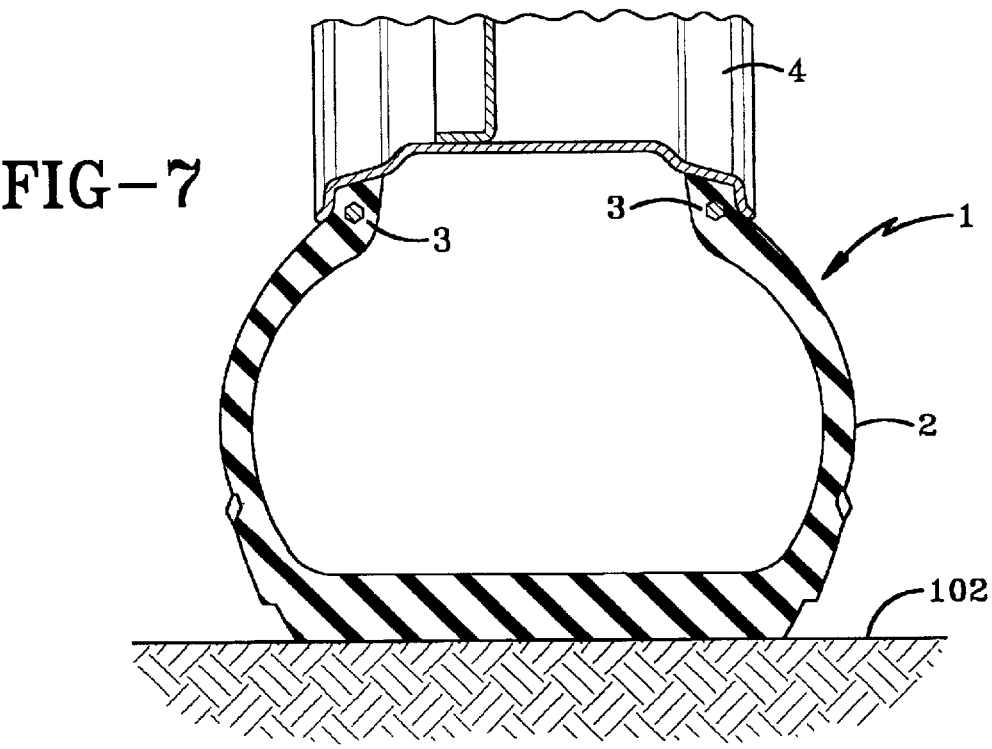
FIG. 7 is a diagrammatic view of the pneumatic tire of the present invention shown in section on a flat roadway surface.

FIG. 7 shows the general position of the lugs for the various tire tread embodiments when the tire is on a generally flat level surface 102, and FIG. 8 shows the various tire embodiments when in an extremely soft soil 105. When in soil 105 the sidewall projections or lugs actually will engage the sidewalls 103 of a rut 104 to dig or raise the tire out of the bottom of the rut to prevent the tire from being stuck or freely spinning in the rut.

Tests have shown that the unique arrangement of the sidewall lugs enable the tire to dig its way free of deep ruts, wherein the ground engaging portions of the tread are out of contact with the bottom of the rut and the sidewall lugs support the weight of the vehicle while moving the vehicle forward keeping the tire moving in the rut or deep depression in soft or compacted soil to prevent the vehicle from being stuck.

In summary, the various tread embodiments described above utilize a ground engaging tread pattern usually consisting of a plurality of circumferentially extending ribs including two shoulder ribs of various geometrical configurations to provide satisfactory on-road riding characteristics as well as enough aggressiveness for off-road conditions. Each of the sidewall lug groups preferably includes three individual lugs which extend outwardly from the axially outermost surfaces of the sidewalls of the tire. Each of the sidewall lugs have a generally flat outer surface which lies in a plane different from the planes of the other two lugs. Likewise, two of the lugs are in radial alignment with each other and extend along the sidewall of the tire, referred to above as the first and third lugs, with the second lug lying intermediate the aligned lugs. Furthermore, the top surface of the first or intermediate lug aligns generally with and is in the same plane as is the inner tread surface 18 of the ground engaging portion of the tread, with the top surface of the second lug generally aligning with and lying in the same general plane as the ground engaging top surface of the adjacent shoulder lug.

As shown in FIGS. 9 and 10, the three separate planes provide by the lug outer surfaces provide three distinct levels or surfaces for engaging the sidewalls of a rut at various levels in the soft or compacted soil. Furthermore these three outer lug surfaces form a plurality of sharp corners with the sidewall and/or adjacent shoulder lug which will cut into the soft soil at various locations to propel the tire forward. As shown particularly in FIGS. 4, 12, 13, and 14, the sidewalls of the three lugs of each lug group form irregularly shaped grooves therebetween which reduce or eliminate debris from being trapped therein, and due to the various angled surfaces will deflect the debris away from the sidewalls reducing the possibility of sidewall penetration.

In the preferred embodiment, top surfaces 17, 30, and 41 will extend approximately 0.25 inches outwardly from the adjacent portion of sidewall 2 as shown by arrows D in FIG. 5, which is a very aggressive extension since it is critical if this extension is too great the lug will become too flexible and lose its forward driving capability.

Also, as shown particularly in FIGS. 9 and 10, outer surfaces 20, 33, and 40 lie generally in planes A, B, and C, respectively which are different with respect to each other, thereby providing end surfaces at three different levels for digging into the side of a rut of soft or compacted soil to assist in the forward traction of the tire. Likewise, these three separate levels make it difficult for debris to lodge between the lugs and will deflect debris from the sidewalls to reduce the penetrating effect thereof. Also, the three lugs of each lug group all have irregular shapes as shown particularly in FIGS. 4, 12, 13, and 14, and in addition to providing the three different levels, provide various angled surfaces in both the forward and rearward direction of travel forming a plurality of sharp corners and edges which will bite into the surrounding soil and reduce the accumulation of mud and other debris between the spaced lugs. Thus, the more edges provided, generally greater is the traction provided thereby.

The terms top and bottom, when referring to the various surfaces of the lugs, are for descriptive purposes only and refer to their location with respect to the main drawing figures. Likewise, when describing the outer surfaces 20, 33 and 40 of the three lugs as generally lying in planes, it is readily understood that depending upon the inflation of the tire and the weight supported thereby, these surfaces will have some curvature thereto. However, when in an at rest uninflated position, these three surfaces will be generally flat. Likewise, the term sharp as used herein is relative since the material is rubber and will have an edge which will not be sharp enough to cut into objects in the literal sense as used, for example, a knife edge. However, this is in contrast to other portions of a tire which have rounded or curved edges which would not provide the same biting effect as achieved by the sharp edges and sidewall projections of the present invention.

While the embodiments of the invention have been described, the invention is not limited thereto. The claims of the invention follow.

What is claimed is:

1. A pneumatic tire comprising a pair of sidewalls with axially outermost surfaces terminating in a pair of bead areas, a plurality of circumferentially extending ribs including at least a pair of shoulder ribs formed of spaced tread lugs extending outwardly from an inner tread surface and terminating in ground engaging surfaces providing a tread pattern for said tire; a plurality of lugs formed integral with the sidewalls and extending outwardly from the axially outermost surface of the sidewalls, said lugs including a plurality of circumferentially spaced lug groups arranged in a circular pattern along each of the sidewalls, each lug group includes first, second, and third lugs; each of said first lugs having a top surface, a lower surface, and an outer surface extending radially along the sidewall from said top surface toward the bead area of the tire, said first lugs having a pair of side surfaces extending between the outer surface of said lugs and the sidewall of the tire forming sharp corners with said outer surface to provide forward fraction for the tire when in deep soil; each of said second lugs having an outer surface extending radially along the sidewall from adjacent the ground engaging surface of an adjacent shoulder rib lug toward the bead area; each of said third lugs being in general radial alignment with said second lug and extending from adjacent said second lugs toward the bead area; said first lugs being located between adjacent pairs of the radially aligned second and third lugs forming irregularly shaped radially extending grooves therebetween to reduce the accumulation of soil and debris between the lugs; the outer surfaces of the first lugs being located outwardly from the outermost surfaces of the sidewalls a greater distance than the outer surfaces of the second and third lugs to provide the forward fraction for the tire, with the outer surfaces of the second and third lugs sloping in the same direction inwardly toward the sidewall of the tire in the direction toward the ground engaging surface to deflect debris away from the sidewalls.

2. The pneumatic tire according to claim 1 wherein the top surfaces of the first lugs extend 0.25 inches radially outwardly from an adjacent portion of the sidewall.

3. The pneumatic tire defined in claim 1 in which the outer surfaces of said first, second, and third lugs each lie generally in a separate plane located at different levels outwardly from the sidewalls.

4. The pneumatic tire defined in claim 1 in which a circumferentially extending groove is formed between adjacent end surfaces of the second and third lugs.

5. The pneumatic tire defined in claim 1 wherein the outer surface of the second lug merges into the outer ground engaging surface of the shoulder lug at a sharp corner.

6. The pneumatic tire defined in claim 1 wherein the top surface of the first lug extends from adjacent the inner tread surface of the tread pattern.

7. The pneumatic tire defined in claim 6 wherein the first lug terminates in a radially extending downwardly tapered end surface.

8. The pneumatic tire defined in claim 7 wherein the end surface and the outer surface of the first lug merge into a sharp corner.

9. The pneumatic tire defined in claim 1 wherein the third lug has top and bottom end surfaces, with said bottom end surface extending generally outwardly from the sidewall forming a relatively sharp corner with the outer surface of said third lug.

10. The pneumatic tire defined in claim 1 wherein the second lug terminates in a tapered bottom end surface and the third lug terminates in a tapered top end surface; and in which said top and bottom end surfaces merge into the sidewall and form a gap therebetween.

11. The pneumatic tire defined in claim 10 wherein the gap formed between the second and third lugs extends generally circumferentially along the sidewall and is in general circumferential alignment with the midpoints of the first lugs.

12. The pneumatic tire defined in claim 1 wherein the tread pattern includes at least a pair of intermediate ribs formed by circumferentially spaced tread lugs; and in which zig-zag grooves are formed by the circumferentially spaced tread lugs of the intermediate and shoulder ribs and extend between the sidewalls.

* * * * *